(12) United States Patent
Kaku et al.

(10) Patent No.: US 8,544,582 B2
(45) Date of Patent: Oct. 1, 2013

(54) UTILITY VEHICLE

(75) Inventors: Hidetoshi Kaku, Lincoln, NE (US);
Tyler Furman, Lincoln, NE (US);
Yoshinori Tsumiyama, Miki (JP);
Kazuhiro Maeda, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 124 days.

(21) Appl. No.: 13/253,906

(22) Filed: Oct. 5, 2011

(65) Prior Publication Data
US 2013/0087402 A1    Apr. 11, 2013

(51) Int. Cl.
*B60K 11/02* (2006.01)
*B60K 11/06* (2006.01)
*B60K 13/04* (2006.01)

(52) U.S. Cl.
USPC ......................................... 180/68.1; 180/309

(58) Field of Classification Search
USPC ................... 180/309, 68.1, 68.2, 68.3, 69.24, 180/291, 296
See application file for complete search history.

(56) References Cited

U.S. PATENT DOCUMENTS

| 4,262,274 | A | * | 4/1981 | Howe et al. | 337/320 |
|---|---|---|---|---|---|
| 4,735,278 | A | * | 4/1988 | Komuro et al. | 180/229 |
| 4,989,500 | A | * | 2/1991 | Anliker et al. | 454/158 |
| 5,689,953 | A | * | 11/1997 | Yamashita et al. | 60/316 |
| 6,427,798 | B1 | * | 8/2002 | Imashige | 180/309 |
| 6,601,667 | B2 | * | 8/2003 | Buell et al. | 180/229 |
| 7,000,719 | B2 | * | 2/2006 | Ceccarani et al. | 180/68.1 |
| 7,303,034 | B1 | * | 12/2007 | Knuth | 180/68.1 |
| 2008/0289896 | A1 | | 11/2008 | Kosuge et al. | |
| 2010/0018792 | A1 | * | 1/2010 | Arnold | 180/219 |

* cited by examiner

*Primary Examiner* — Frank Vanaman
(74) *Attorney, Agent, or Firm* — Alleman Hall McCoy Russell & Tuttle LLP (57) ABSTRACT

A utility vehicle includes an engine accommodated in an engine room below a seat; an engine room side wall defining the engine room and covering the engine from rightward or from leftward; and a cooling fan disposed at one of right and left sides of the engine or and configured to supply cooling air to an interior of the engine room via the engine room side wall.

12 Claims, 9 Drawing Sheets

UTILITY VEHICLE

BACKGROUND OF THE INVENTION

1. Field of the Invention

The present invention relates to a utility vehicle including an engine accommodated in an engine room below a seat.

2. Description of the Related Art

United States Patent Application Publication No. 2008/0289896 discloses an engine room cooling structure for a utility vehicle. In this utility vehicle, an engine is accommodated in an engine room below a seat. The engine room cooling structure includes an air duct extending forward from the engine room to guide ram air from forward to the engine room.

In this cooling structure, when the utility vehicle is driving at a high speed, air is guided to the engine room in a sufficient amount through the air duct and suitably cools the engine room. However, when the utility vehicle is driving at a low speed and/or the engine is running under a high load, the amount of air for cooling the engine room is likely to be insufficient.

SUMMARY OF THE INVENTION

The present invention addresses the above conditions, and an object of the present invention is to suitably cool an engine room, members defining the engine room, and/or components accommodated in the engine room, even when the utility vehicle is driving at a low speed and/or an engine is running under a high load.

According to the present invention, a utility vehicle comprises an engine accommodated in an engine room below a seat; an engine room side wall defining the engine room and covering the engine from rightward or from leftward; and a cooling fan disposed at one of right and left sides of the engine room and configured to supply cooling air to an interior of the engine room via the engine room side wall.

In accordance with this configuration, upon the actuation of the cooling fan, the cooling air is supplied to the engine room. Because of this, even when the vehicle is driving at a low speed, the engine room can be cooled suitably by the cooling air. The cooling fan is disposed at one of right and left sides of the engine room. Since a space in front of the engine room should be occupied by a person seated on a seat, this space is narrow, and therefore it is difficult to dispose the cooling fan in this space. Since elements of the exhaust pipes extending rearward from the engine are arranged densely in a rear region of the engine room, a temperature tends to be elevated easily in this rear region. If the cooling fan is disposed behind the engine, heated air generated in the engine flows to the cooling fan, which is heated in excess. However, in the present invention, since the cooling fan is disposed at one of right and left sides of the engine room, it is possible to mitigate an adverse thermal effect produced by the exhaust pipes and the engine as compared to the configuration in which the cooling fan is disposed behind the engine. Therefore, durability of the cooling fan can be improved.

The above and further objects, features and advantages of the invention will more fully be apparent from the following detailed description with reference to the accompanying drawings.

DETAILED DESCRIPTION OF THE PREFERRED EMBODIMENTS

Hereinafter, a utility vehicle of the present invention will be described with reference to the drawings. Throughout the drawings, the same or corresponding components are identified by the same reference numerals and will not be described in repetition. The stated directions are referenced from the perspective of a driver riding in the utility vehicle unless otherwise explicitly noted.

Figure 1:
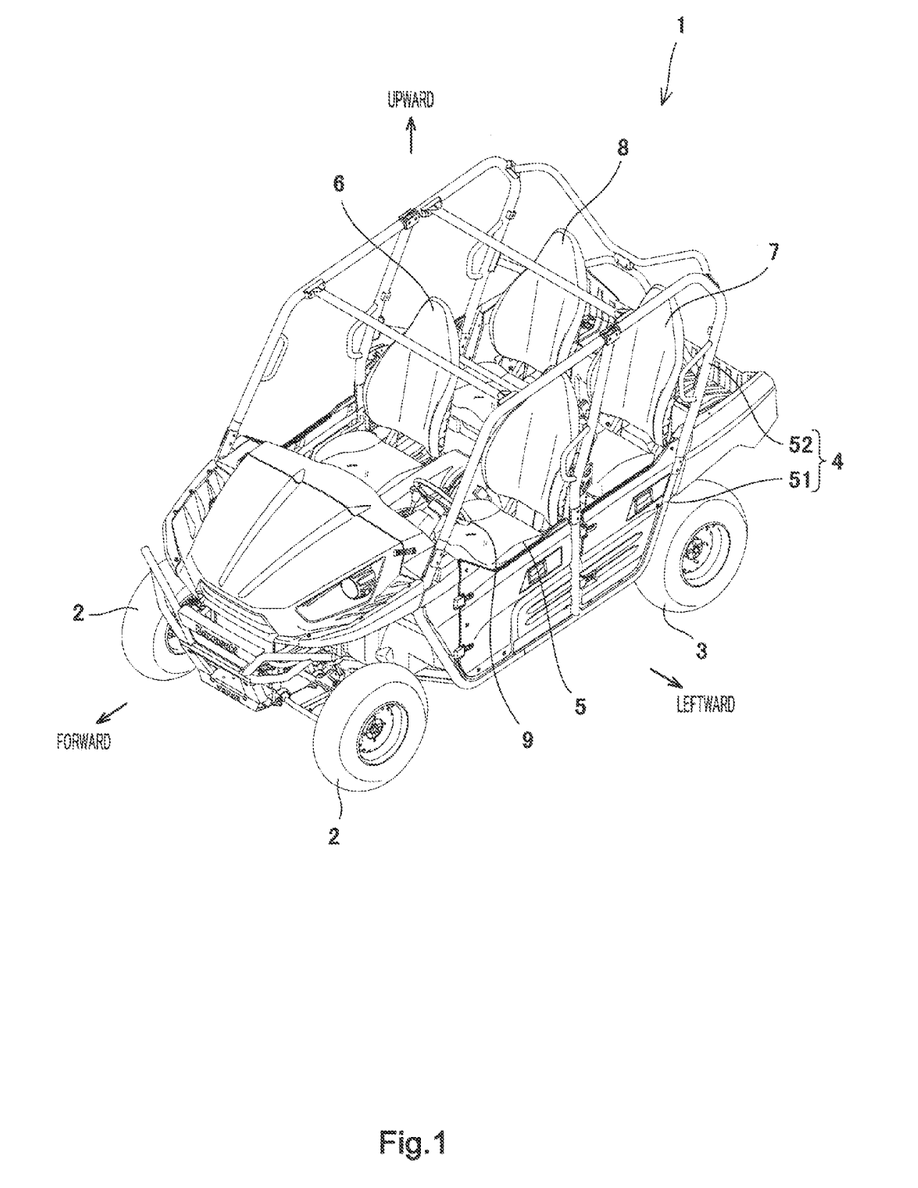
FIG. 1 is a perspective view showing an external appearance of a utility vehicle according to an embodiment of the present invention.

FIG. 1 is a perspective view showing an external appearance of a utility vehicle 1 according to an embodiment of the present invention. As shown in FIG. 1, the utility vehicle 1 includes a pair of right and left front wheels 2, a pair of right and left rear wheels 3, a vehicle body frame 4, a driver seat 5, a passenger seat 6, a left rear seat 7 and a right rear seat 8. The front wheels 2 are suspended from the front portion of the vehicle body frame 4, while the rear wheels 3 are suspended from the rear portion of the vehicle body frame 4. The four seats 5-8 are mounted onto the vehicle body frame 4, and are arranged between the front wheels 2 and the rear wheels 3 in a forward and rearward direction, i.e., longitudinal direction of the utility vehicle 1. The driver seat 5 and the passenger seat 6 are arranged side by side in a rightward and leftward direction (vehicle width direction). In the present embodiment, the driver seat 5 is positioned at the left side, and a steering wheel 9 to be steered by the driver seated on the driver seat 5 is positioned in front of the driver seat 5. The rear seats 7 and 8 are arranged side by side behind the driver seat 5 and the passenger seat 6, respectively.

Figure 2:
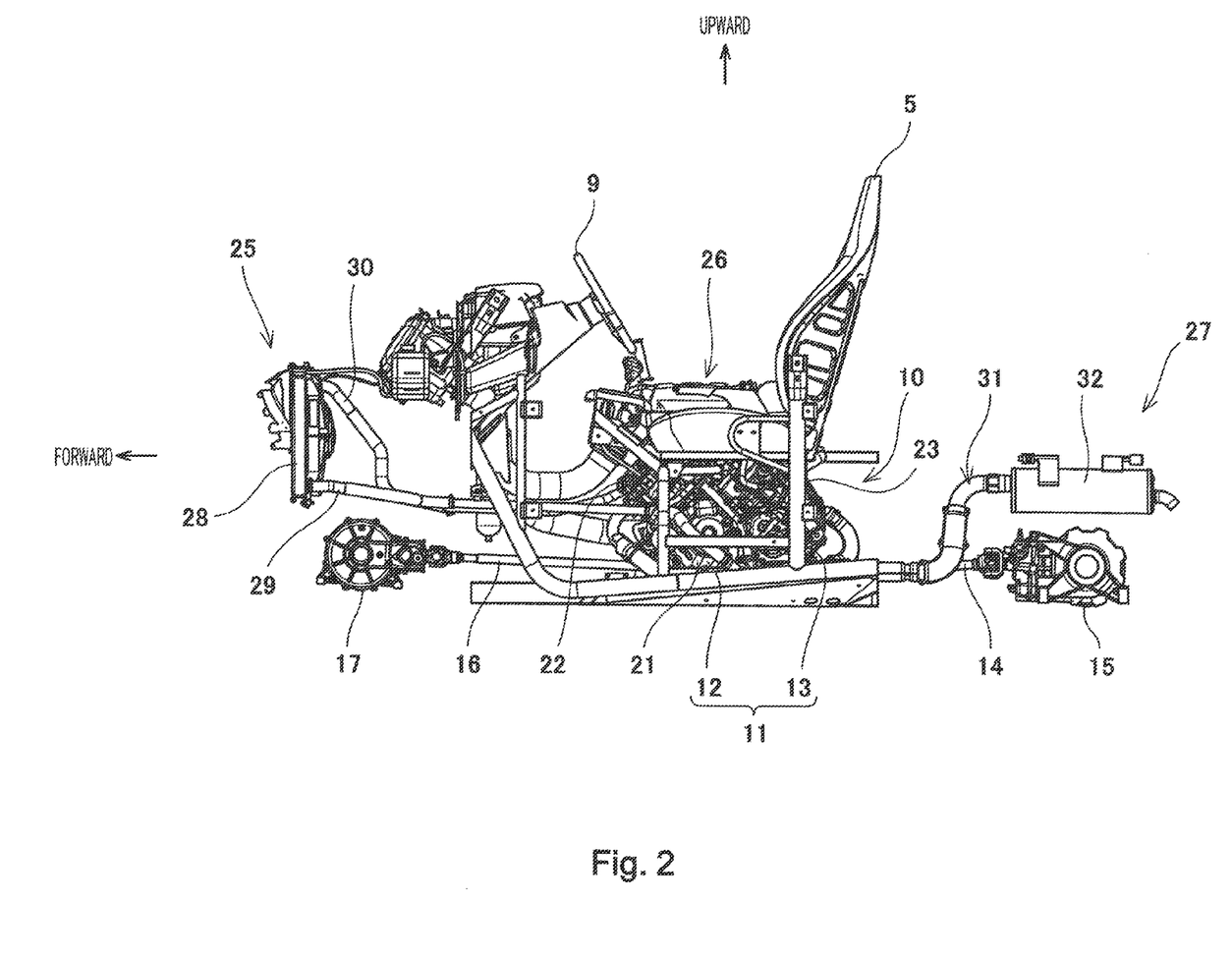
FIG. 2 is a left side view of the utility vehicle, in a state where some components are omitted.

FIG. 2 is a left side view of the utility vehicle 1, showing a state where some components are omitted. As shown in FIG. 2, an engine room 10 is disposed below the driver seat 5 and the passenger seat 6 (see FIG. 1). An engine unit 11 is accommodated in the engine room 10. The engine unit 11 is an assembly including an engine 12 and a transmission (CVT) 13 which are unitarily coupled together. A driving power of the engine 12 is transmitted to the right and left rear wheels 3 (see FIG. 1) via a rear propeller shaft 14 and a rear differential gear device 15, after its speed is changed by the transmission 13. Depending on the case, the driving power of the engine 12 is also delivered to the right and left front wheels 2 (see FIG. 1) via the transmission 13, a front propeller shaft 16 and a front differential gear device 17.

In the present embodiment, the engine 12 is a four-stroke, V-type two-cylinder, and water-cooled engine. An output shaft (not shown) of the engine 12 extends in the substantially right and left direction. The engine 12 includes a crankcase 21 for supporting the engine output shaft such that the engine output shaft is rotatable, a front cylinder 22 extending forward and upward from the crankcase 21, and a rear cylinder 23 extending rearward and upward from the crankcase 21. The front cylinder 22 and the rear cylinder 23 form a V-shape when viewed from the side.

The utility vehicle 1 includes a water-cooling device 25, an air-intake device 26 and an exhaust device 27. The water-cooling device 25 includes a radiator 28 for cooling cooling water used to cool the engine 12, a first cooling water passage 29 through which the cooling water is guided from the radiator 28 to the engine 12, and a second cooling water passage 30 through which the cooling water is returned from the engine 12 to the radiator 28. The first cooling water passage 29 and the second cooling water passage 30 are constituted by pipes made of rubber, synthetic resin, or metal. The air-intake device 26 is disposed above the front and rear cylinders 22 and 23. The front and rear cylinders 22 and 23 are supplied with air from above.

Figure 3:
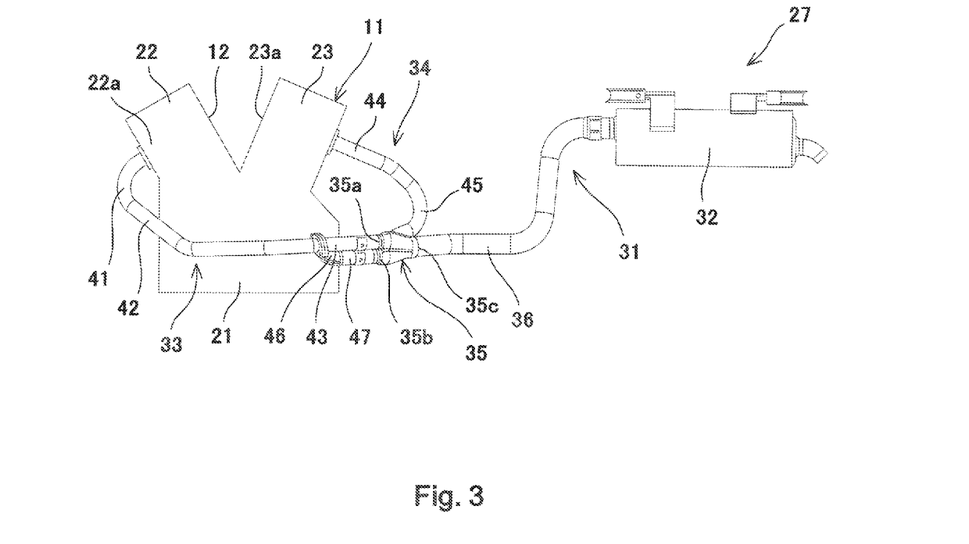
FIG. 3 is a left side view of an exhaust device of FIG. 2.
Figure 4:
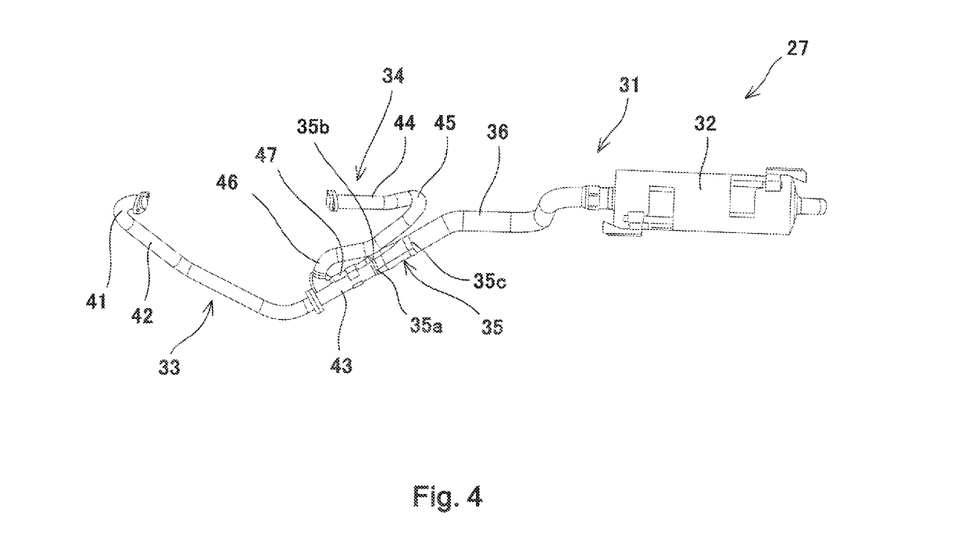
FIG. 4 is a perspective view of the exhaust device of FIG. 2.

FIG. 3 is a left side view of the exhaust device 27 of FIG. 2. FIG. 4 is a perspective view of the exhaust device 27 of FIG. 2. Referring to FIGS. 3 and 4, the exhaust device 27 includes an exhaust pipe 31 extending substantially rearward from the engine 12 and a muffler 32 coupled to the downstream end portion of the exhaust pipe 31.

The exhaust pipe 31 is laid out properly at the left side of the engine 12, and then extends rearward. The exhaust pipe 31 includes a front exhaust pipe 33, a rear exhaust pipe 34, a joint pipe 35 (joint section), and a downstream exhaust pipe 36, to guide gases exhausted from the two cylinders 22 and 23 to the single muffler 32. The front exhaust pipe 33 is coupled to a front wall of a front cylinder head 22a of the front cylinder 22, while the rear exhaust pipe 34 is coupled to a rear wall of a rear cylinder head 23a of the rear cylinder 23. The joint pipe 35 includes two inlets 35a and 35b located adjacently, and a single outlet 35c. The two inlets 35a and 35b are coupled to the single outlet 35c via a V-shaped or Y-shaped passage of the joint pipe 35. The downstream end of the front exhaust pipe 33 is coupled to the inlet 35a of the joint pipe 35, while the downstream end of the rear exhaust pipe 34 is coupled to the inlet 35b of the joint pipe 35. The downstream exhaust pipe 36 is coupled at its upstream end to the outlet 35c of the joint pipe 35 and at its downstream end to the muffler 32.

In the exhaust device 27, the exhaust gas from the front cylinder 22 is exhausted to the front exhaust pipe 33 through the front wall of the front cylinder head 22a and is sent to the inlet 35a of the joint pipe 35 through the front exhaust pipe 33. The exhaust gas from the rear cylinder 23 is exhausted to the rear exhaust pipe 34 through the rear wall of the rear cylinder head 23a, and then is sent to the inlet 35b of the joint pipe 35 through the rear exhaust pipe 34. The exhaust gas sent to the inlet 35a or 35b is sent to the single outlet 35c via the joint passage formed within the joint pipe 35. After that, the exhaust gas is released to atmosphere through the downstream exhaust pipe 36 and then the muffler 32.

The joint pipe 35 disposed at the left side and behind the engine 12. Because of this structure, the front wall of the front cylinder head 22a is farther from the joint pipe 35 than the rear wall of the rear cylinder head 23a. Therefore, the front exhaust pipe 33 extends from the front wall of the front cylinder head 22a and is coupled to the joint pipe 35 with a pipe length which is as short as possible, while the rear exhaust pipe 34 extends from the rear wall of the rear cylinder head 23a, is bent and then is coupled to the joint pipe 35. In this structure, the rear exhaust pipe 34 is allowed to have a length substantially equal to the length of the front exhaust pipe 33. As a result, the front and rear cylinders 22 and 23 can have a substantially equal output capability.

To be specific, the front exhaust pipe 33 includes a first front curved portion 41, a second front curved portion 42, and a front straight portion 43, in this order from upstream side in a flow direction of the exhaust gas. The first front curved portion 41 extends a little in a forward direction from the front wall of the front cylinder head 22a, and then is curved in a rearward direction, in a leftward direction, and in a downward direction. The second front curved portion 42 extends continuously from the first front curved portion 41, and then is curved gently in the rearward direction, in the leftward direction and in the downward direction. The front straight portion 43 extends continuously from the second front curved portion 42, extends substantially in a straight-line shape in a rearward direction at the left side of the crankcase 21, and is coupled to the inlet 35a of the joint pipe 35. In this way, the front exhaust pipe 33 is laid out along the outer surface of the front cylinder 22 and the outer surface of the crankcase 21.

The rear exhaust pipe 34 includes a first rear straight portion 44, a first rear curved portion 45, a second rear curved portion 46 and a second rear straight portion 47, in this order from the upstream side in the flow direction of the exhaust gas. The first rear straight portion 44 extends rearward and downward from the rear wall of the rear cylinder head 23a. The first rear curved portion 45 extends continuously from the first rear straight portion 44, and then is curved in the forward direction, in the leftward direction and in the downward direction. The second rear curved portion 46 extends continuously from the first rear curved portion 45, and then is curved in a substantially-U-shape with a great curvature, i.e., hairpin shape, in the rearward direction and in the leftward direction. The second rear straight portion 47 extends continuously from the second rear curved portion 46 in a substantially straight-line shape in the rearward direction, and is coupled to the inlet 35b of the joint pipe 35. In this way, the rear exhaust pipe 34 is bent to a great degree in two locations in a space behind the rear cylinder 23.

Figure 6:
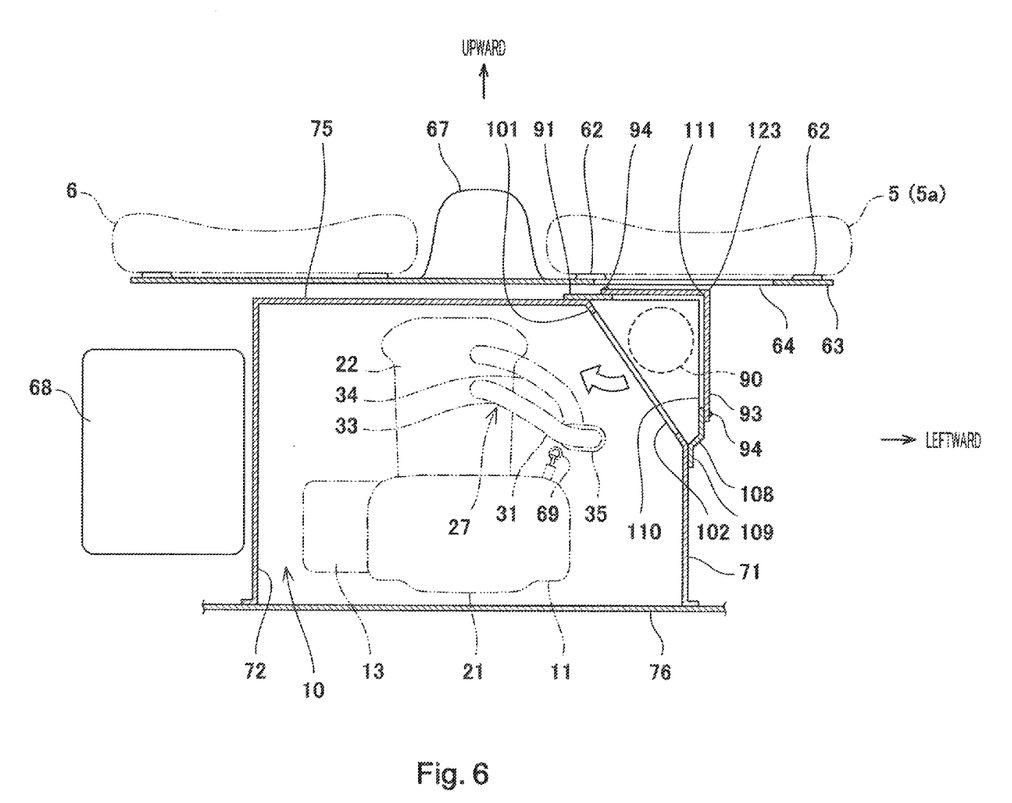
FIG. 6 is a cross-sectional view of an engine room of FIG. 5.

The front exhaust pipe 33, the rear exhaust pipe 34 and the joint pipe 35 are arranged in the interior of the engine room 10 (see FIGS. 2 and 6). The front exhaust pipe 33 and the rear exhaust pipe 34 tend to elevate their temperatures because the exhaust gas which has just been exhausted from the engine 12 flows therethrough. The front exhaust pipe 33 and the rear exhaust pipe 34 are adjacent to the inlet 35a and the inlet 35b of the joint pipe 35, respectively. In particular, in the present embodiment, the rear exhaust pipe 34 includes the second rear curved portion 46 of the hairpin shape and the second rear straight portion 47 extending continuously from the second rear curved portion 46, and the components of the exhaust pipe 31 are arranged densely in a region in the vicinity of the joint pipe 35. Because of this arrangement, high heat is generated particularly in the region in the vicinity of the joint pipe 35. When the engine 12 is running under a high load and/or the utility vehicle 1 (see FIG. 1) is driving at a low speed, the temperature of the engine room 10 is elevated. To address this, a structure and system for suitably cooling the engine room 10 is incorporated into the utility vehicle 1 (see FIG. 1) of the present embodiment.

Figure 5:
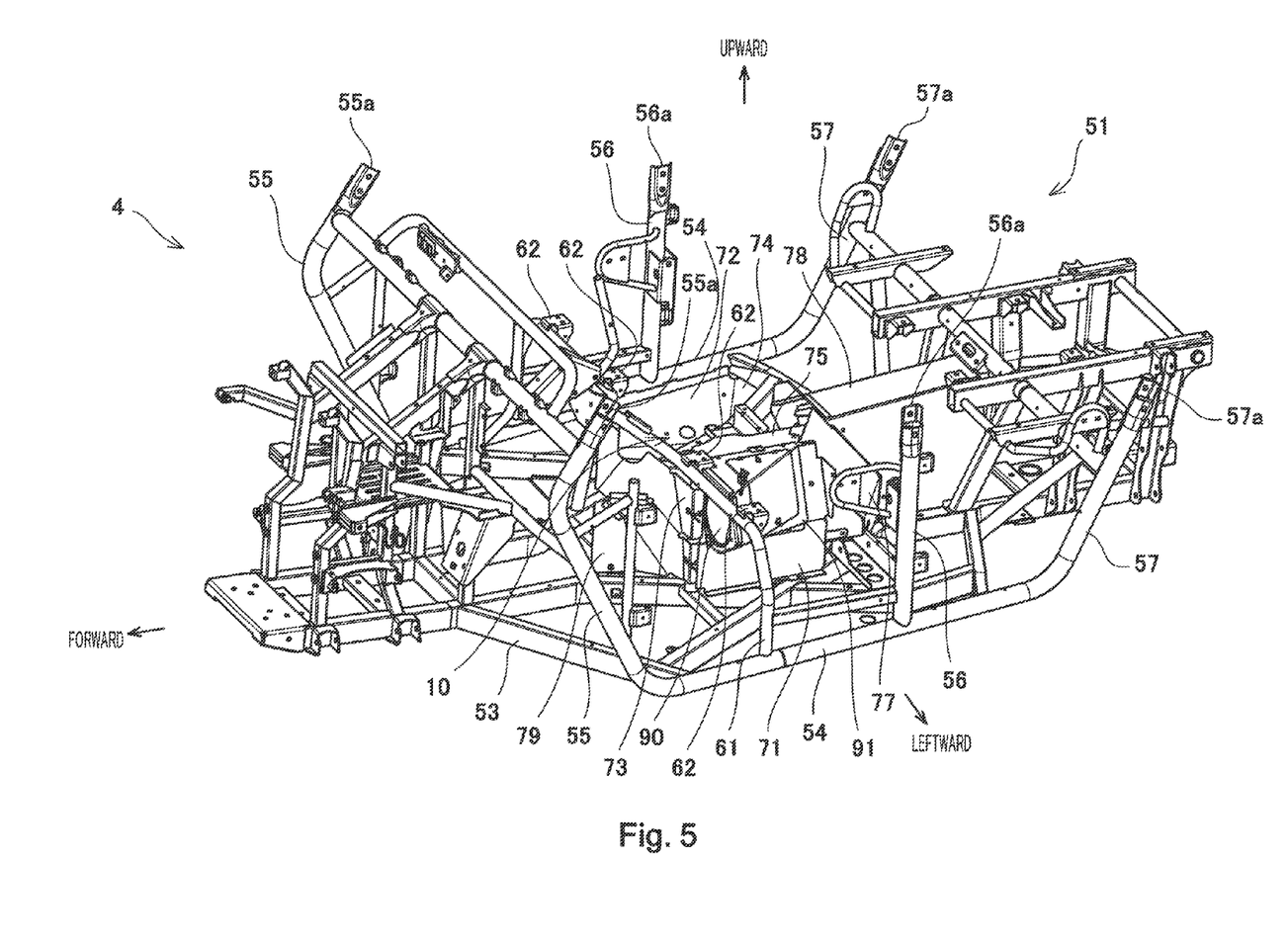
FIG. 5 is a perspective view showing a part of a vehicle body frame of FIG. 1.

FIG. 5 is a perspective view showing a part of a vehicle body frame 4 of FIG. 1. FIG. 6 is a cross-sectional view of the interior of the engine room 10. In FIG. 5, the engine unit 11, the water cooling device 25, the air-intake device 26, the exhaust device 27, etc., are not depicted. As shown in FIG. 5, the vehicle body frame 4 includes a main frame 51. The main frame 51 includes a floor member 53, right and left lower side pipe elements 54, right and left first lower pillar pipe elements 55, right and left second lower pillar pipe elements 56, and right and left third lower pillar pipe elements 57. The floor member 53 is constructed to include a plurality of square pipes having rectangular cross-sections, extending in a substantially horizontal direction and being welded to one another. The floor member 53 faces a ground surface. The front wheels 2 and the rear wheels 3 (see FIG. 1) are mounted to the front portion and rear portion of the floor member 53 via suspension devices (not shown), respectively. The right and left lower side pipe elements 54 extend in the forward and rearward direction in a location outward relative to the floor member 53 in the vehicle width direction (rightward and leftward direction). Right and left first lower pillar pipe elements 55 extend upward from the front end portion of the right lower side pipe element 54 and the front end portion of the left lower side pipe element 54, respectively. Right and left second lower pillar pipe elements 56 extend upward from the center portion of the right lower side pipe element 54 in the forward and rearward direction and the center portion of the left lower side pipe element 54 in the forward and rearward direction, respectively. Right and left third lower pillar pipe elements 57 extend upward from the rear end portion of the right lower side pipe element 54 and the rear end portion of the left lower side pipe element 54, respectively. The pipe elements 54~57 are round pipes having circular cross-sections. The lower side pipe elements 54 are welded to the floor member 53. In FIG. 5, reference symbols 55a, 56a, and 57a designate joint portions by which a cabin frame (ROPS) 52 (see FIG. 1) is joined to the main frame 51.

Figure 11:
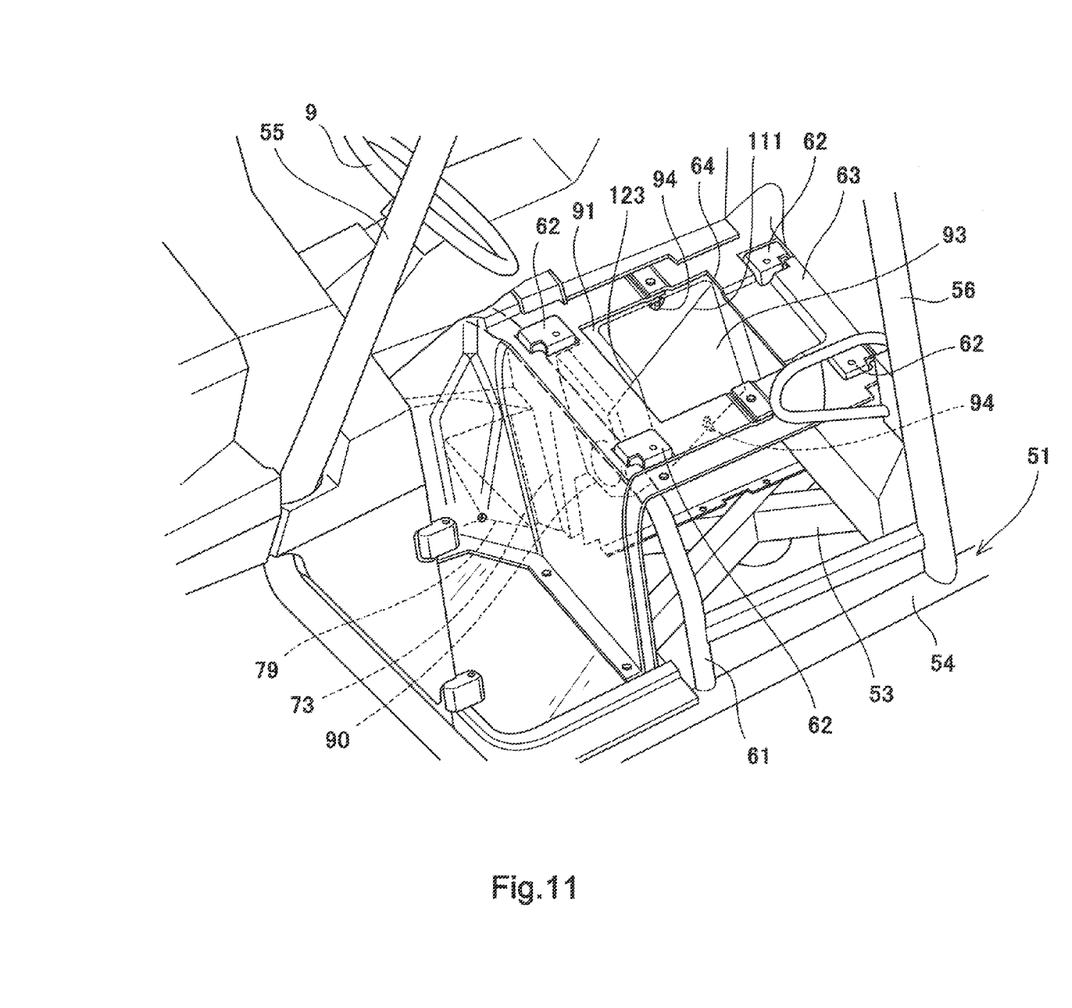
FIG. 11 is a perspective view of the utility vehicle, in a state where a driver seat is detached.

Between the first lower pillar pipe element 55 and the second lower pillar pipe element 56 in the forward and rearward direction, a support frame 61 is provided. The support frame 61 has an arch-shape extending in the substantially rightward and rearward direction. The left end portion of the support frame 61 extends downward and is welded to the left lower side pipe element 54, while the right end portion of the support frame 61 extends downward and is welded to the right lower side pipe element 54. A plurality of plates 62 are fastened onto the support frame 61. The lower portion of the driver seat 5 (see FIGS. 1 and 6) is detachably mounted to the plates 62, and the lower portion of the passenger seat 6 (see FIGS. 1 and 6) are detachably mounted to the plates 62, respectively. As also shown in FIG. 11, the plates 62 are provided at four locations at front side, rear side, left side and right side with respect to the driver seat 5 (see FIGS. 1 and 6).

The engine room 10 is disposed in a space below the support frames 61, above the floor member 53 and closer to the center than the right and left lower side pipe elements 54. In the space, separating walls (left side wall 71, right side wall 72, front wall 73, rear wall 74, upper wall 75 and bottom wall 76 (see FIG. 6)) defining the engine room 10 are provided. These separating walls 71~76 are formed of, for example, thin plate members made of synthetic resin.

The separating walls defining the engine room 10 have a swelling portion 77 swelling outward in the vehicle width direction and in the rearward direction. The swelling portion 77 is provided at the rear portion of the left side wall 71 or the left portion of the rear wall 74. The swelling portion 77 makes the left rear portion of the engine room 10 swell. The swelling portion 77 accommodates the components in the vicinity of the joint pipe 35 (see FIGS. 3 and 6) of the exhaust device 27 (see FIGS. 3 and 6). A tunnel 78 extending in the forward and rearward direction connects with the engine room 10. The tunnel 78 is disposed substantially immediately below the intermediate portion between the right and left rear seats 7 and 8 (see FIG. 1). The common exhaust pipe 31 and the muffler 32 (see FIG. 1) are disposed to extend in substantially the forward and rearward direction, in a location leftward and outward relative to a left separating wall defining the tunnel 78.

At the left side of the engine room 10, i.e., at a side where the driver seat 5 (see FIG. 1), the exhaust pipe 31, and others are arranged, the cooling fan 90 is positioned. The cooling fan 90 is, for example, an electric axial fan. Upon the actuation of the cooling fan 90, airflow (hereinafter this airflow referred to as cooling air) is blown out from the cooling fan 90 and delivered to the interior of the engine room 10 through the left side wall 71 of the engine room 10. This cooling air can suitably cool the engine room 10 when the engine 12 (see FIG. 3) is running under a high load and/or the utility vehicle 1 (see FIG. 1) is driving at a low speed.

It is relatively difficult to ensure a space in which the cooling fan 90 is disposed, in a space in front of the engine room 10, because the driver seated on the driver seat 5 (see FIGS. 1 and 2) and the passenger seated on the passenger seat 6 (see FIG. 1) are required to be accommodated in this space. Since the exhaust pipe 31 (see FIGS. 3 and 6) and the muffler 32 (see FIG. 3) are arranged in a rear region of the engine room 10, a temperature tends to be elevated especially in this rear region. If the cooling fan 90 is positioned behind the engine 12 (see FIGS. 2 and 3), heated air from the engine 12 (see FIGS. 2 and 3) could flow to the cooling fan 90, and excessively heat the cooling fan 90. In the present embodiment, the cooling fan 90 is disposed at one of right and left sides. Positioning the cooling fan 90 at one of right and left sides of the engine room 10 is easier than positioning the cooling fan 90 in front of the engine room 10. In addition, an adverse thermal effect from the exhaust device 27 (see FIGS. 3 and 6) and the engine 12 (see FIGS. 2 and 3) can be made lesser by positioning the cooling fan 90 at one of right and left sides of the engine room 10 than positioning the cooling fan 90 behind the engine room 10.

A guide member 79 is mounted to the left portion of the front wall 73 of the engine room 10. The guide member 79 has a tapered outer surface tilted in the forward direction toward a center in the vehicle width direction. During driving of the utility vehicle 1 (see FIG. 1), ram air from forward is guided toward a region outward and leftward relative to the engine room 10, along the tapered outer surface of the guide member 79. In this manner, since ram air with a relatively low temperature is supplied to the cooling fan 90, the cooling fan 90 can supply cooling air with a low temperature to the engine room 10.

FIG. 6 is a cross-sectional view of the interior of the engine room 10 as viewed from the front. Referring to FIG. 6, the engine unit 11 is accommodated in the center region in the interior of the engine room 10. The continuously variable transmission (CVT) 13 is positioned at the right side of the engine 12. The exhaust pipe 31 (exhaust device 27) is disposed at the left side of the engine 12. Thus, the engine 12 is disposed in a well-balanced manner in the rightward and leftward direction (vehicle width direction). Outside the engine room 10, a fuel tank 68 is disposed. The fuel tank 68 is positioned closer to a side where the passenger seat 6 is disposed, than the engine room 10, in the rightward and leftward direction. The fuel tank 68 is positioned closer to the right end of the utility vehicle 1 than the engine room 10. Because of this, the fuel tank 68 serves as a counterweight against the weight of the driver when the driver is driving the utility vehicle 1 (see FIG. 1) without the passenger riding together in the utility vehicle 1, thereby keeping a weight balance in the rightward and leftward direction. That is, the cooling fan 90 is disposed at an opposite side of the fuel tank 68 in the rightward and leftward direction. In this structure, the fuel tank 68 does not impede supplying of the cooling air to the interior of the engine room 10, and it is not necessary to change the position and volume of the fuel tank 68 undesirably when the cooling fan 90 is positioned.

Figure 7:
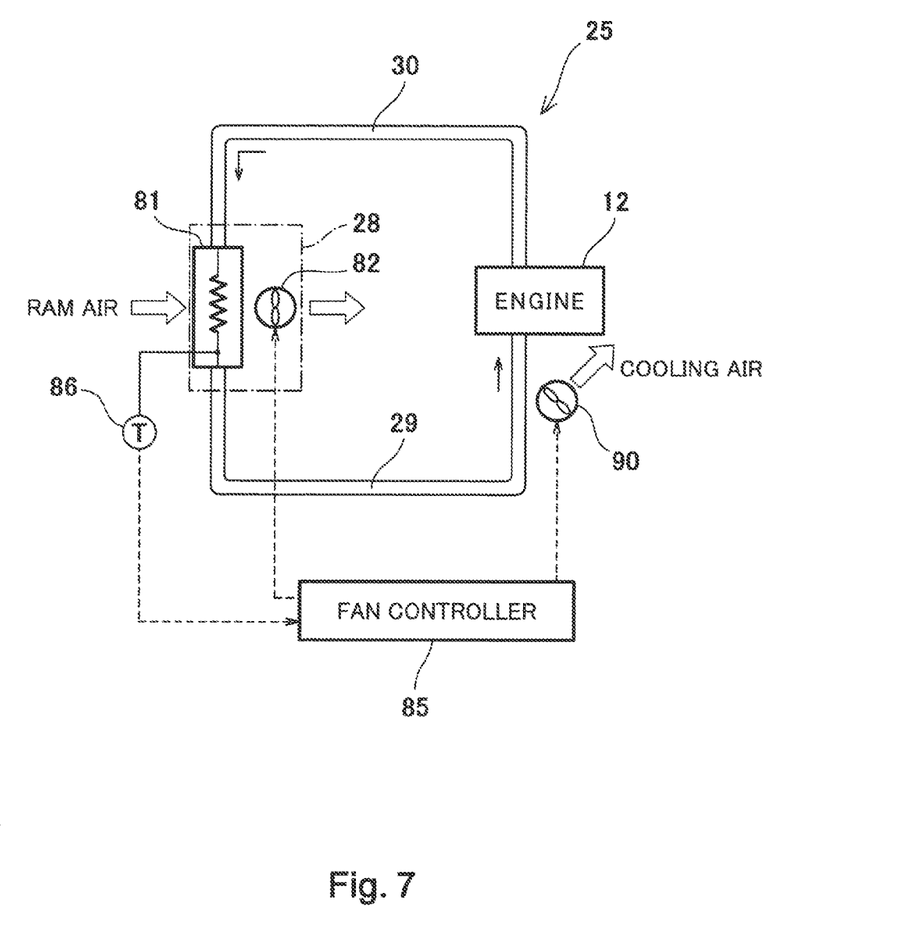
FIG. 7 is a schematic view showing a construction of a control system for controlling the operation of a cooling fan of FIG. 5.

FIG. 7 is a schematic view showing a construction of a control system for controlling the operation of the cooling fan 90. Referring to FIG. 7, the utility vehicle 1 (see FIG. 1) includes a fan controller 85 and a water temperature sensor 86 in addition to the above stated radiator 28. The radiator 28 includes a radiator passage 81 and a radiator fan 82. The downstream end portion of the second cooling water passage 30 is connected to the upstream end portion of the first cooling water passage 29 via the radiator passage 81. Thus, the cooling water is circulated between the engine 12 and the radiator 28 through the second cooling water passage 30 and the first cooling water passage 29. In the radiator passage 81 of the radiator 28, the cooling water supplied from the engine 12 via the second cooling water passage 30 exchanges heat with the ram air and is thereby cooled. The radiator fan 82 is an electric air blower for forcibly cooling the radiator passage 81. A water temperature 86 is adapted to detect the temperature of the cooling water, to be precise, the temperature of the cooling water in the radiator passage 81. The fan controller 85 actuates the radiator fan 82 when the temperature of the cooling water detected by the water temperature sensor 86 is not less than a predetermined value. In this configuration, it is possible to suitably cool the cooling water by forced air cooling by using the radiator fan 82, even when cooling of the cooling water performed by utilizing only the ram air is insufficient, or the utility vehicle 1 (see FIG. 1) is driving at a low speed.

The fan controller 85 also controls the operation of the cooling fan 90 for cooling the engine room 10, in addition to the radiator fan 82. The fan controller 85 actuates the cooling fan 90 together with the radiator fan 82 when the temperature of the cooling water detected by the water temperature sensor 86 is not less than the predetermined value. On the other hand, the fan controller 85 stops the cooling fan 90 along with the radiator fan 82, when the temperature detected by the cooling water detected by the water temperature sensor 86 is less than the predetermined value. Thus, the cooling fan 90 is unactuated in a state where the temperature of the cooling water in the engine 12 is less than the predetermined value and the engine 12 is sufficiently cooled by the cooling water. This makes it possible to effectively cool the engine room 10 while suppressing electric power consumption and attenuating a noise level. In addition, the fan controller 85 for controlling the radiator fan 82 is used to control the cooling fan 90, and the cooling fan 90 operates synchronously with the radiator fan 82. This can simplify hardware and software for controlling the cooling fan 90.

Figure 8:
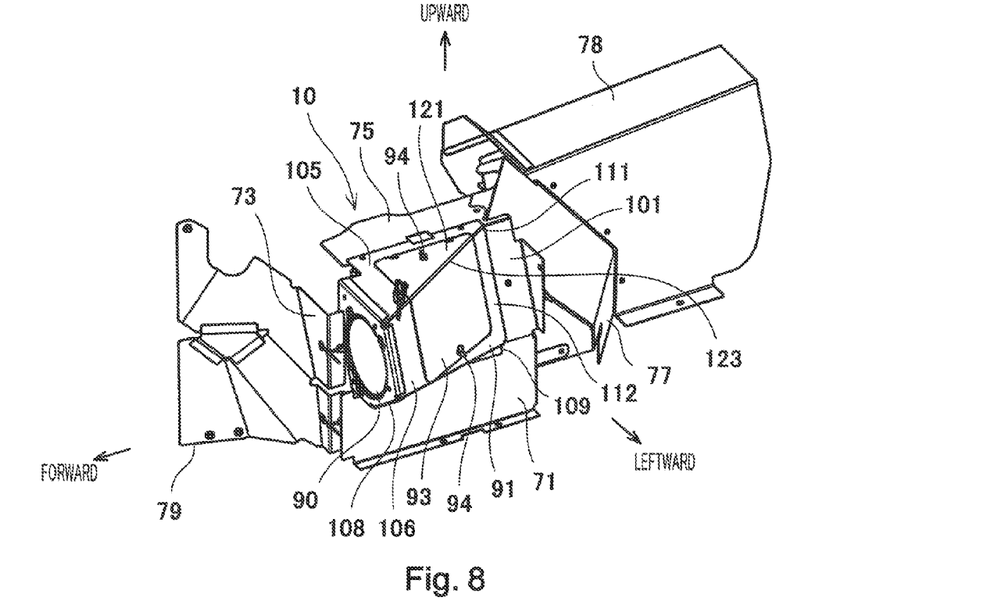
FIG. 8 is a perspective view showing a configuration of a region surrounding the cooling fan of FIG. 5, as viewed from the left.
Figure 9:
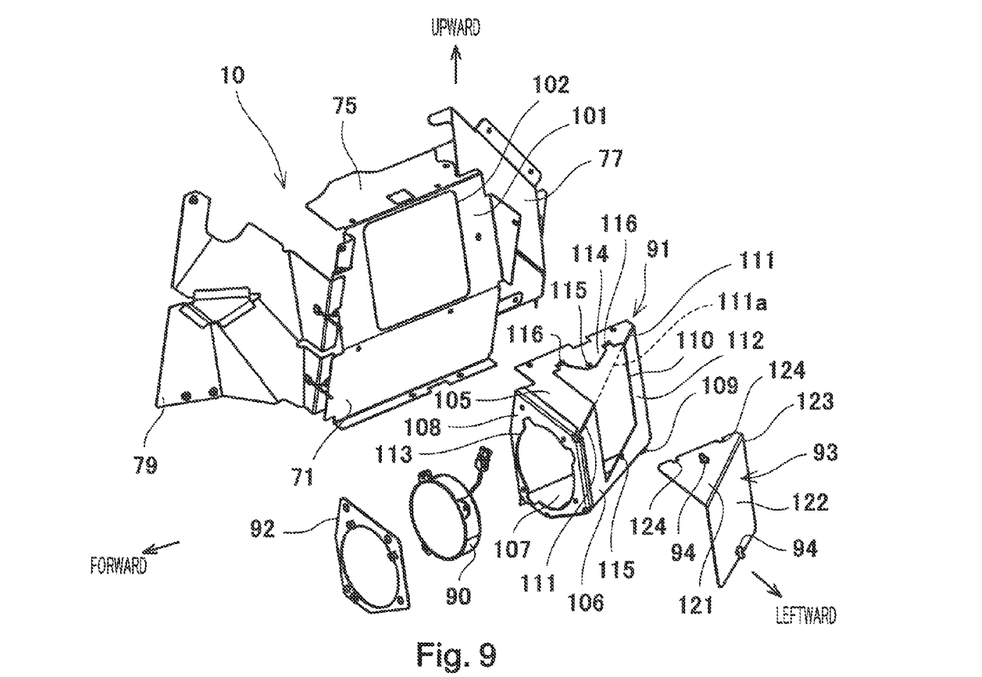
FIG. 9 is an exploded perspective view of the configuration of FIG. 8.
Figure 10:
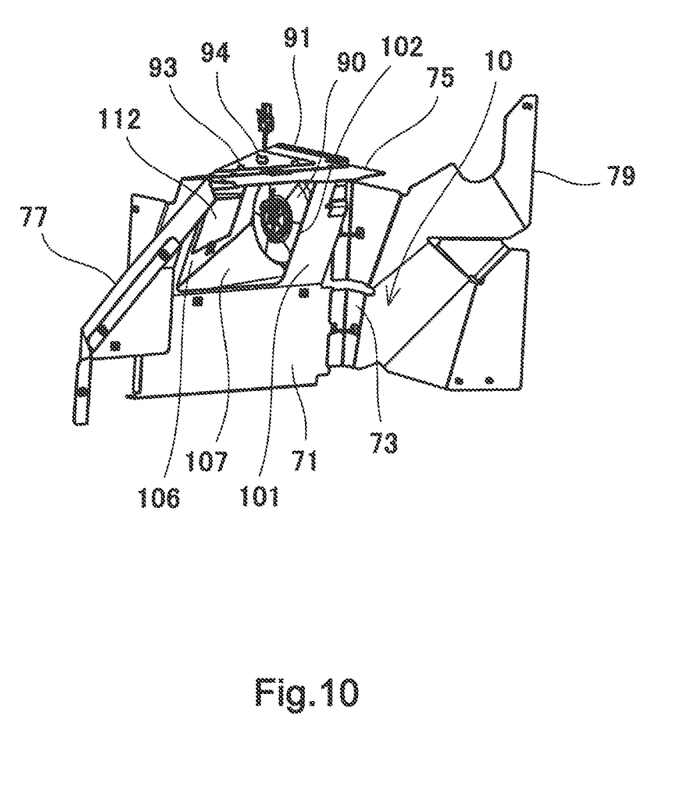
FIG. 10 is a perspective view of the configuration of FIG. 8, as viewed from the right side.

FIG. 8 is a perspective view showing a configuration of a region surrounding the cooling fan 90, as viewed from the left. FIG. 9 is an exploded perspective view of the configuration of FIG. 8. FIG. 10 is an exploded perspective view of the configuration of FIG. 8, as viewed from the right side.

Referring to FIG. 9, the left side wall 71 of the engine room 10 has at an upper portion thereof a tilted portion 101 which is tilted so as to protrude leftward in the downward direction. The tilted portion 101 has an air inlet 102 having a substantially rectangular shape. The air inlet 102 is covered with a duct member 91.

The duct member 91 has a duct upper wall 105, a duct side wall 106, a duct bottom wall 107, a duct front wall 108, a mounting flange 109 and a maintenance opening 110. The duct upper wall 105 is joined to the upper wall 75 of the engine room 10 by means of bolts or rivets. The duct upper wall 105 extends to the left from the upper wall 75 and the upper edge of the tilted portion 101. The mounting flange 109 is brought into contact with a portion of the left side wall 71 of the engine room 10 which is lower than the tilted portion 101 from the left side and is joined to this portion by means of bolts or rivets. The duct side wall 106 extends downward from a left edge portion 111 of the duct upper wall 105. The left edge portion 111 of the duct upper wall 105 and the duct side wall 106 are tilted to the right side in the rearward direction as viewed from the above. A rear edge portion 112 of the duct side wall 106 is in close contact with the tilted portion 101. The duct upper wall 105 and the duct bottom wall 107 have a substantially triangular shape as viewed from above.

The duct front wall 108 extends vertically at the left side of the left side wall 71 of the engine room 10 and has a substantially rectangular shape as viewed from the front. The duct front wall 108 has a circular mounting hole 113 in a center region thereof. The cooling fan 90 is mounted to the back surface of the duct front wall 108 via a plate 92 so as to close the mounting hole 113. The maintenance opening 110 penetrates the duct member 91. In the present embodiment, the maintenance opening 110 extends over the duct upper wall 105 and the duct side wall 106 and has a cross-section of an inverted-L-shape (see FIG. 6).

The maintenance opening 110 is opened and closed by a lid member 93. The lid member 93 has an inverted-L shape to conform to the shape of the maintenance opening 110. The lid member 93 has a lid upper wall 121 and a lid side wall 122. The lid side wall 122 extends downward from a left edge portion 123 of the upper wall 121. The left edge portion 123 of the lid upper wall 121 is tilted to the right in the rearward direction like the duct upper wall 105. Because of this structure, the lid upper wall 121 has a substantially triangular shape as viewed from above.

Each of the lid upper wall 121 and the lid side wall 122 is provided with a clip 94. The clip 94 has a rotatable grab portion on the outer side surface of the lid member 93. The duct upper wall 105 has a protruding portion 114 formed by protruding to the left, a center portion of the right edge portion of the maintenance opening 110 in the forward and rearward direction. The protruding portion 114 has a receiver hole 115 for receiving the clip 94. The receiver hole 115 penetrates the protruding portion 114. The duct side wall 106 has a receiver hole 115 similar to the receiver hole 115 of the protruding portion 114. The receiver hole 115 of the duct side wall 106 is in close proximity to the lower edge of the maintenance opening 110.

The maintenance opening 110 is closed by the lid member 93 according to the following procedure. Initially, the lid upper wall 121 is put on the upper surface of the duct upper wall 105, and the lid side wall 122 is brought into contact with the outer surface of the duct side wall 106. Thereby, the left edge portion of the lid upper wall 121 is aligned with the left edge portion of the duct upper wall 105 as viewed from above. A pair of hooks (nails) 116 provided on the duct upper wall 105 so as to sandwich the protruding portion 114 are fitted to a pair of recesses 124 provided at the right edge portion of the lid upper wall 121, respectively. This allows the lid member 93 to be positioned with respect to the duct member 91 in the forward and rearward direction. In this state, the clip 94 of the lid upper wall 121 is aligned with the receiver hole 115 of the protruding portion 114 in a vertical direction, and the clip 94 of the lid side wall 122 is aligned with the receiver hole 115 of the duct side wall 106 in the rightward and leftward direction. By rotating the grab portions of the clips 94, the clips 94 are engaged with the receiver holes 115, respectively. In this way, the lid member 93 is fastened to the duct member 91, thereby maintaining a state where the maintenance opening 110 is closed by the lid member 93. When the maintenance opening 110 is opened, the grab portions of the clips 94 are rotated in an opposite direction, to disengage the clips 94 from the receiver holes 115, respectively. In this way, the lid member 93 can be detached from the duct member 91, and the maintenance opening 110 is opened.

With reference to FIGS. 8 and 10, upon the actuation of the cooling fan 90 in the state where the maintenance opening 110 is closed, the cooling air is blown out from the cooling fan 90 in the rearward direction into the inside of the duct member 91. Since the duct side wall 106 of the duct member 91 is tilted to the right side in the rearward direction as described above, the cooling air inside the duct member 91 is guided to the right side along the inner surface of the duct side wall 106. That is, the cooling air is guided toward the air inlet 102. Therefore, the cooling air is guided to the interior of the engine room 10 through the air inlet 102. Since the duct side wall 106 is tilted as described above, the cross-section of the internal passage of the duct member 91 decreases in the rearward direction. This structure enables the cooling air with an increased flow rate to be guided to the interior of the engine room 10. In this manner, the cooling air can suitably cool the interior of the engine room 10.

The air inlet 102 is formed on the left side wall 71 of the engine room 10. In the interior of the engine room 10, the exhaust pipe 31 (see FIGS. 3 and 6) is laid out at the left side of the engine 12 (see FIGS. 3 and 6). Because of this structure, the air inlet 102 faces the exhaust pipe 31 in the rightward and leftward direction. Therefore, the cooling air is blown to the exhaust pipe 31 through the air inlet 102. In this way, the exhaust pipe 31, which is a heat generating component which generates high heat in the interior of the engine room 10, can be cooled suitably, and the temperature in the interior of the engine room 10 can be suppressed from increasing in excess.

The swelling portion 77 is provided just behind the air inlet 102 to accommodate components in the vicinity of the joint pipe 35 (see FIGS. 3 and 6). Therefore, the cooling air flows easily to the inside of the swelling portion 77 through the air inlet 102. In this way, the region in the vicinity the joint pipe 35 where very high heat is generated can be cooled suitably.

FIG. 11 is a perspective view of the utility vehicle 1, from which the driver seat 5 is detached. As shown in FIG. 11, a panel member 63 made of synthetic resin is secured onto a seat frame 61. The plurality of plates 62 protrude upward further than the panel member 63. The driver seat 5 (see FIG. 6) is positioned higher than the panel member 63 in a state where the driver seat 5 (see FIG. 6) is mounted to the plates 62.

The panel member 63 has a rectangular opening 64 in a region between the left plate 62 and the right plate 62 in the rightward and leftward direction, and is immediately under the intermediate portion of a seat member 5*a* (see FIG. 6) of the driver seat 5. The opening 64 is covered with the seat portion 5*a* of the driver seat 5 in a state where the driver seat 5 is mounted to the plates 62.

A user of the utility vehicle 1 can access the lid member 93 through the opening 64 formed in the panel member 63, by detaching the driver seat 5 (see FIG. 6). The opening 64 has a substantially rectangular shape, while each of the lid upper wall 121 and the duct upper wall 105 has substantially the triangular shape as described above. The left edge portion 123 of the lid member 93 and the left edge portion 111 of the duct upper wall 105 extend from a right upper corner portion of the opening 64 toward a portion slightly rightward relative to the center portion of the front edge portion defining the opening 64 in the rightward and leftward direction. That is, the left edge portion 123 of the lid member 93 and the left edge portion 111 of the duct upper wall 105 extend rightward relative to a diagonal line of the opening 64. Because of this structure, a space which is more than a half of a space below the opening 64 is not occupied by the duct member 91 and the lid member 93. The user can insert the user's hand into this space from above through the opening 64. Therefore, the user can easily access the grab portion of the clip 94 of the lid upper wall 121 and the grab portion of the clip 94 of the front side wall 122. The user can detach the lid member 93 from the duct member 91 by rotating the grab portions and lift the lid member 93 up through the opening 64.

With reference to FIGS. 6 and 11, in the state where the lid member 93 is detached from the duct member 91, the user can see the interior of the engine room 10 or insert the user's hand into the interior of the engine room 10 through the opening 64, the maintenance opening 110 and the air inlet 102. The maintenance opening 110 extends over the duct upper wall 105 and the duct side wall 106. This allows the user to have a wide view of the interior of the duct member 91 through the maintenance opening 110 which is wide open, from obliquely above the opening 64. The air inlet 102 is provided on the tilted portion 101 of the left side wall 71 of the engine room 10. The tilted portion 101 is tilted to the right side in an upward direction. This allows the user to see easily the interior of the engine room 10 through the air inlet 102 even from above the opening 64. That is, the air inlet 102 also serves as a window through which the user inserts the user's hand into the engine room 10 or the user looks into the interior of the engine room 10, when the user performs a maintenance operation for the interior of the engine room 10. To supply the cooling air to the interior of the engine room 10 through the left side wall 71, the duct member 91 is mounted to the left side wall 71 and the cooling fan 90 is mounted to the duct front wall 108. Since the cooling fan 90 is not directly mounted to the left side wall 71 of the engine room 10 in this way, the air inlet 102 can serve as a window through which the maintenance operation is carried out.

Referring to FIG. 9, since the protruding portion 114 of the duct upper wall 105 is positioned rightward relative to an imaginary line 111*a* connecting right and left portions of the left edge portion 111 of the duct upper wall 105 which are separated by the maintenance opening 110. This can suitably prevent the protruding portion 114 from narrowing a view from above toward an inside of the maintenance opening 110 in the state where the maintenance opening 110 is opened.

Referring to FIG. 6, in the present embodiment, an oil level gauge 69 is attached on the left portion of the crankcase 21. In the state where the lid member 93 is detached from the duct member 91, the user can easily check the amount of engine oil, or how the engine oil deteriorates, by manipulating or seeing the oil level gauge 69.

As should be appreciated from the foregoing, in accordance with the present embodiment, the cooling air from the cooling fan 90 can be supplied to the interior of the engine room 10 through the left side wall 71 of the engine room 10, and can suitably cool the engine room 10. However, the present invention is in no way intended to exclude a configuration in which the separating wall of the engine room 10 is provided with an air duct extending forward from the engine room 10 to guide the ram air to the interior of the engine room 10, but such an air duct may be incorporated into the utility vehicle 1.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
an engine accommodated in an engine room below a seat;
an engine room side wall defining the engine room and covering the engine from rightward or from leftward;
a cooling fan disposed adjacent the engine room on one of right and left sides of the vehicle and configured to supply cooling air to an interior of the engine room via the engine room side wall; and
a duct member mounted to the engine room side wall and covering an air inlet formed in the engine room side wall, wherein,
the cooling fan is mounted to a front wall of the duct member, and the cooling air is supplied from the cooling fan to the interior of the engine room via an inside of the duct member and the air inlet;
the duct member has a duct upper wall extending from the engine room side wall to said one of right and left sides of the vehicle, and a duct side wall extending downward from an edge portion of the duct upper wall on said one of right and left sides of the vehicle; and
the edge portion of the duct upper wall and the duct side wall are tilted to an opposite side of the one of the right and left sides of the vehicle, in a rearward direction.

2. The utility vehicle according to claim 1, further comprising an exhaust pipe extending rearward from the engine,
wherein the exhaust pipe is laid out adjacent the engine at said one of right and left sides of the vehicle in the interior of the engine room, and the cooling air supplied from the cooling fan is blown to the exhaust pipe in the interior of the engine room.

3. The utility vehicle according to claim 2, wherein:
the engine includes a plurality of cylinders;
the exhaust pipe includes a front exhaust pipe coupled to a front cylinder of the plurality of cylinders, a rear exhaust pipe coupled to a rear cylinder of the plurality of cylinders, and a joint section at which the front exhaust pipe and the rear exhaust pipe are joined together; and
the joint section is disposed adjacent the engine at said one of right and left sides of the vehicle, and the cooling air supplied from the cooling fan is blown to a region in a vicinity of the joint section.

4. The utility vehicle according to claim 3, wherein:
the engine is a V-type engine including the front cylinder and the rear cylinder;
the engine has an output shaft extending in a substantially rightward and leftward direction of the utility vehicle; and
the rear exhaust pipe of the rear cylinder includes a plurality of curved portions and has a length substantially equal to a length of the front exhaust pipe of the front cylinder.

5. The utility vehicle according to claim 2, further comprising a fuel tank of the engine, wherein:
the seat includes a driver seat and a passenger seat arranged side by side in a rightward and leftward direction;
the fuel tank is positioned closer to the passenger seat than the engine; and
the exhaust pipe and the cooling fan are positioned closer to the driver seat than the engine.

6. The utility vehicle according to claim 1, wherein the duct member has an internal passage with a cross-section which decreases in a rearward direction.

7. The utility vehicle according to claim 1, further comprising:
a radiator for cooling cooling water used to cool the engine, the radiator including a radiator fan;
a temperature sensor for detecting a temperature of the cooling water; and
a fan controller for controlling an operation of the radiator fan,
wherein the fan controller actuates the cooling fan along with the radiator fan when the temperature detected by the temperature sensor is not less than a predetermined temperature.

8. A utility vehicle comprising:
an engine accommodated in an engine room below a seat;
an engine room side wall defining the engine room and covering the engine from rightward or from leftward;
a cooling fan disposed adjacent the engine room at one of right and left sides of the vehicle and configured to supply cooling air to an interior of the engine room via the engine room side wall; and
a duct member mounted to the engine room side wall and covering an air inlet formed in the engine room side wall, wherein,
the cooling air is supplied from the cooling fan to the interior of the engine room via an inside of the duct member and the air inlet;
the duct member has a maintenance opening penetrating the duct member, a duct upper wall extending from the engine room side wall to said one of right and left sides of the vehicle, and a duct side wall extending downward from an edge portion of the duct upper wall on said one of right and left sides of the vehicle; and
the maintenance opening extends over the duct upper wall and the duct side wall.

9. The utility vehicle according to claim 8,
wherein the cooling fan is mounted to a front wall of the duct member.

10. The utility vehicle according to claim 9, wherein the duct member is opened and closed by a lid member attached to the maintenance opening.

11. The utility vehicle according to claim 8, further comprising a panel member disposed between the seat and the engine room,
wherein the panel member has an opening covered with the seat, and a lid member is exposed through the opening in a state where the seat is detached.

12. The utility vehicle according to claim 11, wherein:
the engine room side wall has a tilted portion protruding to said one of right and left sides of the vehicle in a downward direction; and
the air inlet is formed in the tilted portion.

* * * * *